C. C. SCHWANER.
Dash-Board.

No. 159,848. Patented Feb. 16, 1875.

WITNESSES:
E. Wolff
N. F. Terry

INVENTOR:
C. C. Schwaner
BY Munn
ATTORNEYS.

UNITED STATES PATENT OFFICE.

CHRISTIAN C. SCHWANER, OF WINTERSET, IOWA.

IMPROVEMENT IN DASH-BOARDS.

Specification forming part of Letters Patent No. 159,848, dated February 16, 1875; application filed January 4, 1875.

*To all whom it may concern:*

Figure 1:
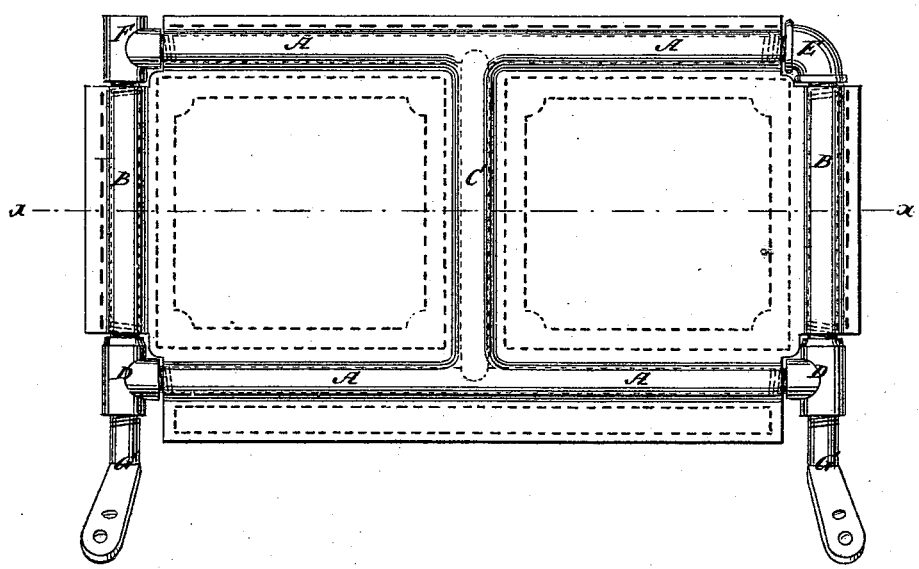
Figure 2:
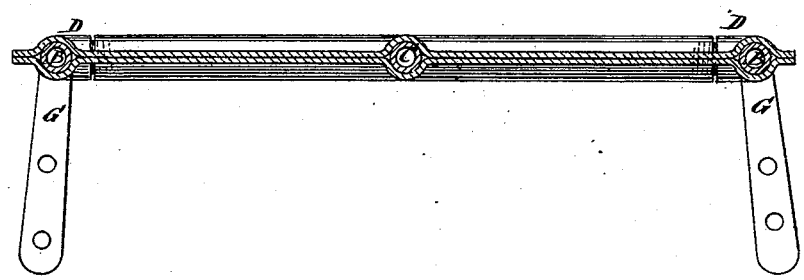

Be it known that I, C. C. SCHWANER, of Winterset, in the county of Madison and State of Iowa, have invented a new and useful Improvement in Dash-Board for Buggies, &c., of which the following is a specification:

Figure 1 is a front view of one of my improved dash-boards. Fig. 2 is a horizontal section of the same, taken through the line $x$ $x$, Fig. 1.

Similar letters of reference indicate corresponding parts.

My invention has for its object to furnish an improved dash for buggies and other vehicles, the frame of which shall be so formed that it may be contracted or expanded should the leather cover be made too tight or too loose, and which will enable all the stitching to be done before the said cover is applied to the said frame.

The invention consists in an improved dash-frame, formed by connecting the top, bottom, and end bars with each other by T and cross couplings, or by T and elbow couplings, as hereinafter fully described.

A are the bottom and top bars. B are the end bars, and C is the center bar. The bars A and B have a right-hand screw-thread cut upon one end, and a left-hand screw-thread cut upon the other end. The lower ends of the end bar B and the ends of the bottom bar A are connected together by T or cross couplings D. The upper ends of the end bars B and the ends of the top bar A are connected to each other by elbow, T, or cross or curved couplings E, as shown in Fig. 1.

By this construction, by turning the bars in one direction the couplings will be drawn toward each other, and the frame will be contracted, and by turning the said bars in the other direction the couplings will be pushed from each other, and the frame will be expanded, so that the leather or cloth cover can be adjusted as required.

In case it is desired that the dash should have a top rail, T, cross, or elbow couplings F should also be used at the upper corners of the frame.

By the use of T, cross, and elbow couplings handles may be formed upon the ends of the dash-board.

G are the irons by which the dash-board is secured to the body of the wagon, the upper ends of which irons are screwed into the lower arms of the T and cross couplings D.

The center bar C may be secured to the top and bottom bars by T-couplings; or the ends of said center bar may be inserted in notches in the said top and bottom bars.

With this construction the leather cover H is all or partly stitched. The bars are then inserted, the couplings are put on and adjusted to give the desired tension to the cover.

The bars A B C of the frame may be hollow or solid, as may be desired.

Having thus described my invention, what I claim as new, and desire to secure by Letters Patent, is—

The dash-frame, formed of bars A and B, and the screw-couplings, combined as and for the purpose specified.

CHRISTIAN C. SCHWANER.

Witnesses:
 NATHAN FOSTER,
 W. M. THOMPSON.